United States Patent [19]

Dijkstra et al.

[11] Patent Number: 4,722,517

[45] Date of Patent: Feb. 2, 1988

[54] MECHANICAL SPRING HAVING NEGATIVE SPRING STIFFNESS USEFUL IN AN ELECTROACOUSTIC TRANSDUCER

[76] Inventors: Kees Dijkstra; Bernard P. Videc; Jan Huizinga, Groenewoudseweg 1, all of Eindhoven, Netherlands

[21] Appl. No.: 844,048

[22] Filed: Mar. 26, 1986

Related U.S. Application Data

[62] Division of Ser. No. 598,637, Apr. 10, 1984, Pat. No. 4,607,382.

[30] Foreign Application Priority Data

Apr. 26, 1983 [NL] Netherlands ........................ 8301460

[51] Int. Cl.[4] ................................................ F16F 3/00

[52] U.S. Cl. .................................... 267/164; 267/160

[58] Field of Search .................. 267/71, 74, 158, 160, 267/164, 165, 159, 162; 188/381

[56] References Cited

U.S. PATENT DOCUMENTS

| | | | |
|---|---|---|---|
| 2,726,041 | 12/1955 | Winet | 267/162 X |
| 3,175,766 | 3/1965 | Pape et al. | 267/162 X |
| 3,508,020 | 4/1970 | Culver | 267/164 X |

FOREIGN PATENT DOCUMENTS

| | | | |
|---|---|---|---|
| 342415 | 2/1931 | United Kingdom | 267/164 |

*Primary Examiner*—Duane A. Reger

[57] ABSTRACT

A mechanical spring with negative spring stiffness adapted for use in an electroacoustic transducer unit for reducing the transducer resonant frequency. The mechanical spring with negative spring stiffness comprises two blade springs having both ends coupled to each other and which, under the influence of a compressive force F which acts in a direction along an imaginary line through both ends of the mechanical spring, are each bent in one of two opposite directions.

8 Claims, 18 Drawing Figures

Figure 1A:
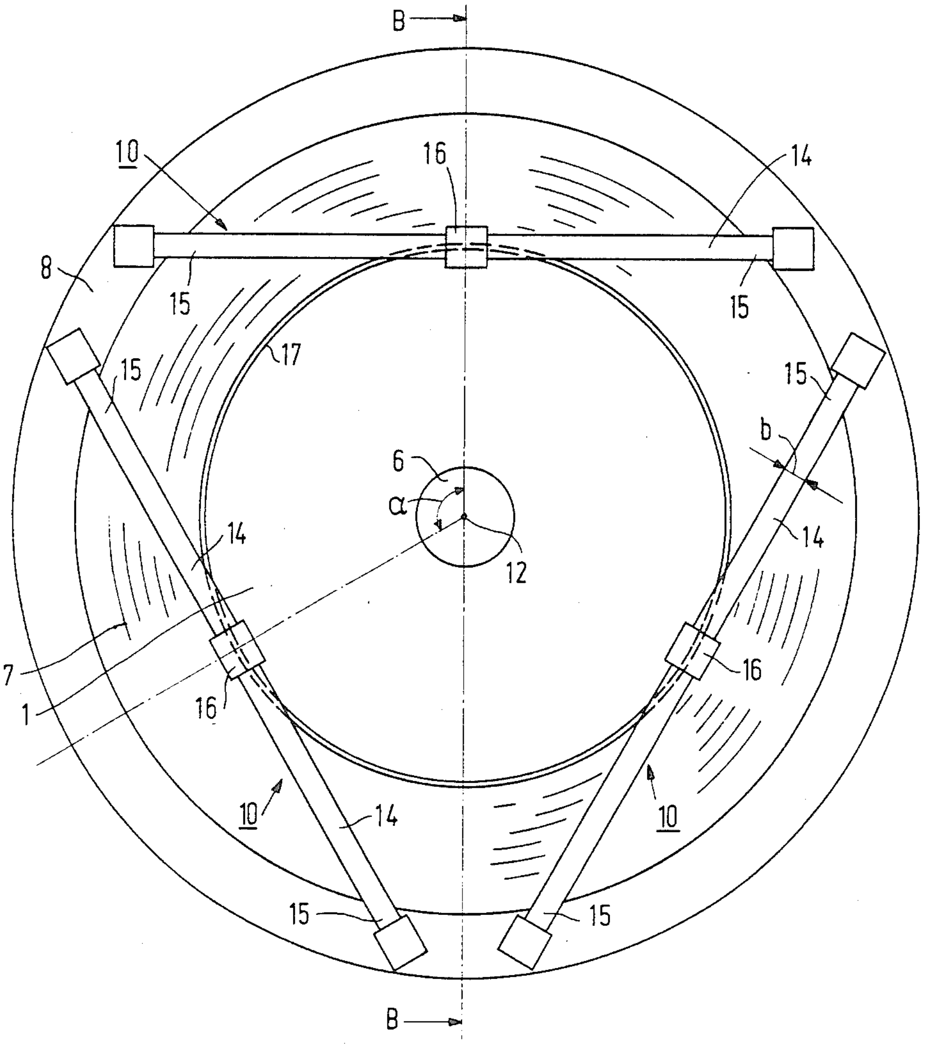

MECHANICAL SPRING HAVING NEGATIVE SPRING STIFFNESS USEFUL IN AN ELECTROACOUSTIC TRANSDUCER

This is a division of application Ser. No. 598,637, filed Apr. 10, 1984, now U.S. Pat. No. 4,607,382.

This invention relates to an electroacoustic transducer unit comprising a mechanical spring with negative spring stiffness coupled between a movable part of the transducer and a stationary part of the transducer unit. More particularly, the invention relates to a mechanical spring with negative spring stiffness.

Electroacoustic transducer units are disclosed in, for example, U.S. Pat. No. 2,846,520 and German Patent Specification No. 1,299,327. Both publications describe an electroacoustic transducer unit comprising an electrodynamic transducer (a moving-coil loudspeaker). However, the invention is not limited thereto but also relates to other types of electroacoustic transducer unit, such as for example units comprising piezoelectric transducers.

Electroacoustic transducer units which are not equipped with means for reducing the resonant frequency of the transducer give rise to the problem that if they comprise a transducer which is accomodated in an at least substantially airtight enclosure (loudspeaker box) of a relatively small volume, the resonant frequency of the transducer is shifted towards higher frequencies under the influence of the volume of air in the enclosure, which acts on the transducer diaphragm as a mechanical spring. This is a disadvantage because it reduces the operating-frequency range of the transducer. The resonant frequency of the transducer defines the lower limit of the operating-frequency range of the transducer. As a result of the shift of the resonant frequency towards higher frequencies the operating-frequency range of the transducer is limited at the low-frequency end, which means that the transducer can no longer reproduce specific low-frequency information. In order to compensate for this, the two afore-mentioned Patent Specifications propose specific means for reducing the resonant frequency of the transducer. In accordance with these proposals a mechanical spring with negative spring stiffness is provided between a movable part of the transducer and a stationary part of the transducer unit. Examples of movable parts of the transducer are the diaphragm of the transducer, or (in the case of electrodynamic transducers) the voice-coil former, or (in the case of piezoelectric transducers) the piezoelectric actuator. An example of a stationary part of the transducer unit is the chassis of the transducer or a fixing point on an enclosure (loudspeaker box) belonging to the transducer unit, if the said transducer is accomodated in such an enclosure. This reduces the effective spring stiffness to which the diaphragm is subjected, thereby reducing the resonant frequency of the transducer. The known electroacoustic transducer units have the disadvantage that generally the output signal is distorted severely.

It is an object of the invention to provide a mechanical spring with negative stiffness useful, for example, in an electroacoustic transducer unit so that a substantially lower distortion occurs in the signal to be reproduced. According to the invention a mechanical spring is constructed by means of two blade springs having both ends coupled to each other and which, under the influence of a compressive force which acts on both ends of the mechanical spring in a direction along an imaginary line through said both ends, are each bent in one of two opposite directions.

The invention is based on the recognition of the fact that the high distortion in the output signal of known transducers is due to the instability of the mechanical springs with negative stiffness, so that the voice coil may be tilted and is consequently off-centred in the air gap of the magnet system. If the mechanical spring with negative stiffness (hereinafter referred to as "negative spring") is now constructed by means of two blade springs, a more stable construction is obtained, which also yields a better centering. This centering can be improved further by making the blade springs wide (i.e. by selecting a large width-length ratio), which yields a higher resistance to torsion and lateral displacements.

Moreover, the distortion in transducers equipped with a mechanical spring with negative stiffness which is bent to one side only, as described in for example the aforementioned German Patent Specification, is caused by the fact that in the case of an excessive deflection of the diaphragm in the direction opposite to the direction of bending of the mechanical spring, this spring will collapse to the other side due to inter alia mass inertia. By providing at least one of the major surfaces of the blade springs spaced from each other, this collapsing is also prevented.

A preferred embodiment of the invention is characterized in that the centres of the two blade springs are also secured to each other, facing halves of the two blade springs each being bent in one of two opposite directions under the influence of the compressive force. This embodiment provides a higher resistance to lateral displacements and pivoting of the centre. When such a negative spring is used the centre of the negative spring may be coupled to the moving part (diaphragm voice-coil former) of the transducer and the two ends may be coupled to the stationary part of the transducer unit.

An advantage of this embodiment is that the diaphragm or the voice-coil former is not loaded by the compressive forces which maintain the blade springs in the bent shape and which act in a direction perpendicular to the direction of movement of the diaphragm and the voice-coil former. Alternatively, the two ends of the negative spring may be secured to the diaphragm or the voice coil former and the centre to the stationary part of the transducer unit. However, the latter requires additional fixing means in order to secure the centre of the blade spring to the stationary part of the transducer. In the last-mentioned situation in the case of moving-coil loudspeakers the stationary part is, for example, the centre pole of the magnet system.

In another application of the invention the means for reducing the resonant frequency of the transducer may comprise n mechanical springs with negative spring stiffness, which springs are arranged at angles of 360°/n relative to each other around a central axis of the transducer, where $n \geqq 2$ and is preferably equal to three or higher. If $n \geqq 3$, the means for reducing the resonant frequency of the transducer may also function as a centering means for centering the moving parts, such as the diaphragm (and in the case of an electrodynamic transducer a voice-coil former) of the transducer. The customary centering means, if they have no acoustic sealing function (for example the centering ring which centres the voice-coil former in the air gap) may then be dispensed with. However, even if $n=2$ a satisfacory centering of the moving parts can be achieved in some cases, namely (as will be apparent from the foregoing) by using a blade spring of large width. If the transducer is provided with two blade springs which are secured to the voice-coil former and which are made of an electrically conductive material, they may be used as connecting leads for the electric signal to be applied to the voice coil.

In order to preclude the occurrence of mechanical vibrations in the blade springs and consequent additional distortion in the output signal, the blade springs are preferably provided with a layer of a damping material. The layer of damping material damps mechanical vibrations so that (substantially) no additional distortion need arise. Preferably, the layer of damping material also functions as the aforesaid spacing means for keeping the parts of said blade springs spaced from each other in the case of a large excursion of the diaphragm.

In some transducer units incorporating the invention (namely transducer units comprising electroacoustic transducers for which the absolute value of the spring stiffness of the mechanical spring with negative spring stiffness is greater than the spring stiffness of the diaphragm suspension the use of the mechanical spring with negative spring stiffness may lead to the diaphragm being in a state of unstable equilibrium in its zero position (when the diaphragm excursion is zero). This means that in the case of a small displacement of the diaphragm out of its zero position the diaphragm may move to a specific deflected position under the influence of the mechanical spring, in which deflected position it will remain. In this deflected position there is an equilibrium of forces as a result of the mechanical spring (which tends to urge the diaphragm further out of its zero position) and the oppositely directed spring force of the diaphragm suspension. Said deflected condition may therefore be a positive or a negative deflection of the diaphragm.

If no balance of forces can be achieved the diaphragm will move further out of its zero position until the diaphragm has reached its position of maximum deflection. Hereinafter it will be assumed that this position of maximum deflection is the position occupied by the diaphragm when the transducer is not in operation.

In order to compensate for said state of unstable equilibrium it is known from the publication "Improvement of low-frequency response in small loudspeaker systems by means the stabilized negative-spring principle" by T. Matzuk, see J.A.S.A., Vol. 49, No. 5 (Part 1), 1971, pages 1362–1367, to provide the transducer unit with a control device for correcting the average position of the diaphragm of the transducer in response to a control signal to be generated by the control device, and with detection means for detecting the average position of the diaphragm relative to its zero position and for supplying an output signal which is applied to the control device. This ensures that the zero position of the diaphragm does not change during use of the transducer. Moreover it is achieved that, before the transducer is used, the diaphragm is first set from said deflected position (position of maximum deflection) to the zero position. Such a control device may require a substantially lower electric power than the means in the known devices. This is because it need only comprise a very simple control system for controlling the diaphragm position. Moreover, this control system can operate with very low frequencies, i.e. frequencies well below the operating-frequency range of the transducer, which means that the control system need introduce hardly any distortion within the operating-frequency range of the transducer.

The known control device comprises an air pump by means of which the average position of the diaphragm can be corrected by means of an air-pressure variation in the enclosure. Instead of this, if the transducer is constructed as a moving-coil loudspeaker, the control device may be constructed to supply the control signal to the voice coil. Both possibilities are comparatively simple to construct. The electrical control (by means of the voice coil) has the disadvantage that a compartively high (electric) power may be required to set the diaphragm from its deflected position to its zero position when the transducer unit is put into operation, whereas the pneumatic control requires the use of a non-porous diaphragm in the transducer. This means that special diaphragm materials are required and the customary paper diaphragms (paper cones) are not very suitable for this purpose. The detection means may operate capacitively (for example a metal plate on the diaphragm which cooperates with a stationary plate, the capacitance between the two plates being measured), inductively (for example a metal plate on the diaphragm which cooperates with a stationary coil, the inductance of the coil being measured), optoelectrically (for example by measuring the intensity of a light signal emitted by a light source and reflected by the diaphragm surface) or pneumatically (namely by measuring the average air pressure in the enclosure if the transducer is accommodated therein).

A mechanical spring with negative spring stiffness comprising a blade spring which, under the influence of a compressive force which acts in a direction perpendicular to the direction in which the blade spring deflects, is bent in a direction corresponding to this direction of deflection in such a way that both halves of the blade spring are each bent one time, is known per se from British Patent Specification No. 617,076, see FIG. 1, and from the dissertation by J. F. Dijksman, entitled "A study of some aspects of the mechanical behaviour of cross-spring pivots and plate spring mechanisms with negative stiffness", see FIGS. 1.2 and 1.3. Such a spring has the disadvantage that it has no resistance to lateral displacements and pivoting of the centre. These two movements are coupled and, as already stated hereinbefore, may lead to collapsing of the blade spring so that the spring is bent towards the other side. An improvement is obtained by providing the mechanical spring with linear guide means to counteract the lateral displacements. The dissertation by Dijksman shows such linear guide means. However, linear guide means have the disadvantage that they introduce additional friction. Moreover, such constructions are rather expensive.

The invention aims at providing a mechanical spring with negative spring stiffness which has a higher resistance to lateral displacements and pivoting of the centre and which is also cheap to manufacture. To this end the mechanical spring is characterized in that it comprises a second blade spring with the ends and the centres of both blade springs coupled to each other. The second blade spring is bent in such a manner under the influence of said compressive force that the two halves of the second blade spring are each bent one time in a direction corresponding to said direction of deflection, and facing halves of the two blade springs are each bent in mutually opposite directions.

If there is no external limitation of the maximum deflection of the mechanical spring, it may occur that due to the mass inertia of parts of the blade springs, these parts still collapse to the other side in the case of very large deflections. In order to prevent this, at least one of the two facing major surfaces of the blade springs is provided with the aforesaid spacing means for keeping parts of the two blade springs spaced from each other in the case of a large deflection of the mechanical spring in said direction of deflection.

As set forth in the foregoing each of the two versions of the mechanical spring is particularly suitable for use in electroacoustic transducers in order to reduce the resonant frequency of the transducer. However, the mechanical spring with negative spring stiffness may also be used in other fields and cases, for example in those cases where (too) large positive spring stiffnesses must be corrected. Another use is for example in high-vacuum machines employing bellows. The addition of a mechanical spring with negative spring stiffness then serves to compensate for the positive spring stiffness of the bellows.

Figure 1B:
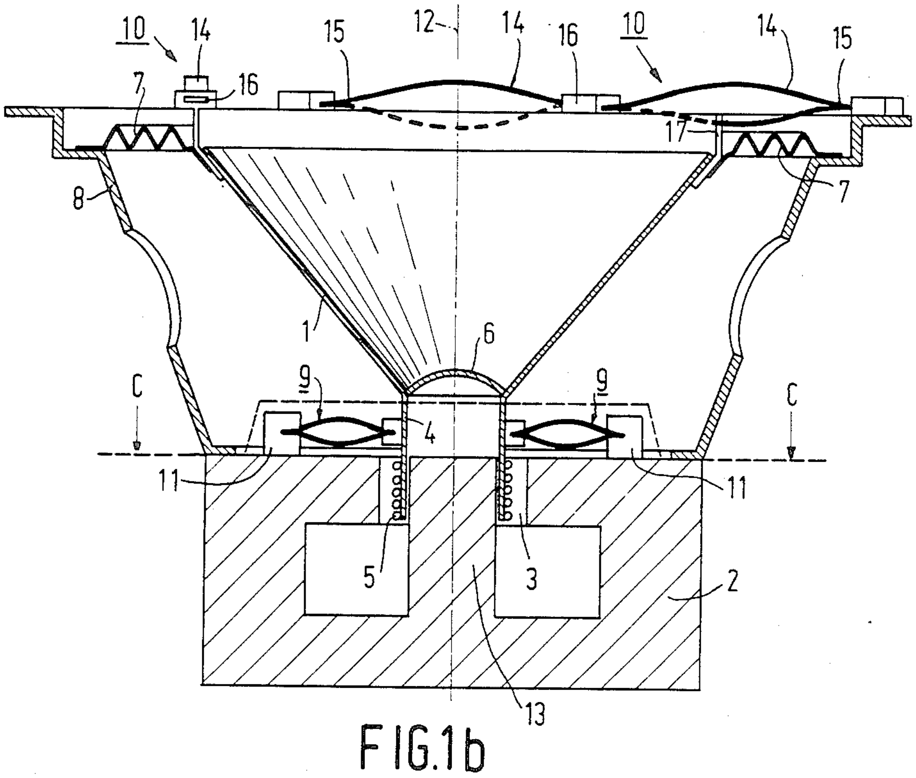
Figure 1C:
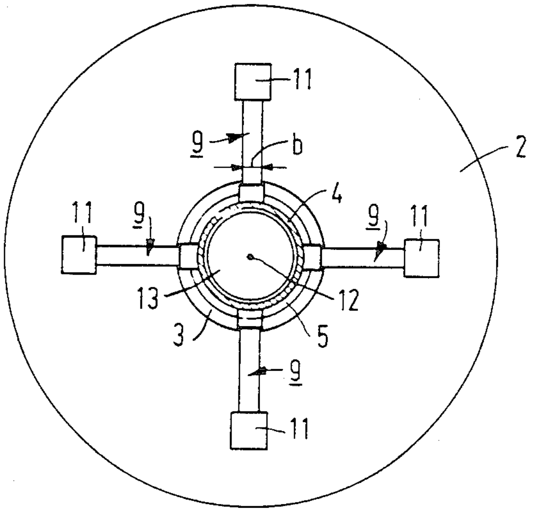
Figure 3A:
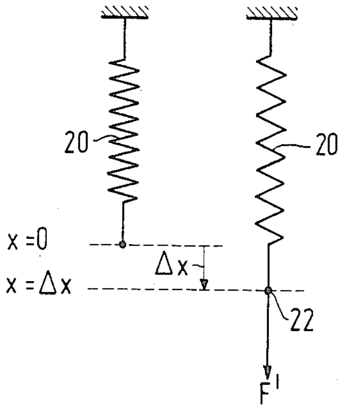
Figure 3B:
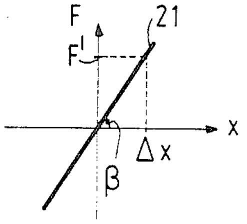
Figure 4A:
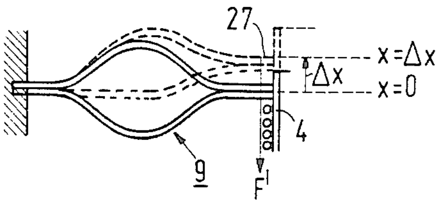
Figure 4B:
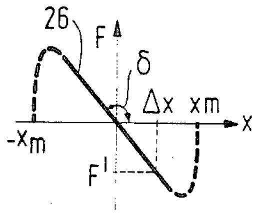
Figure 5:
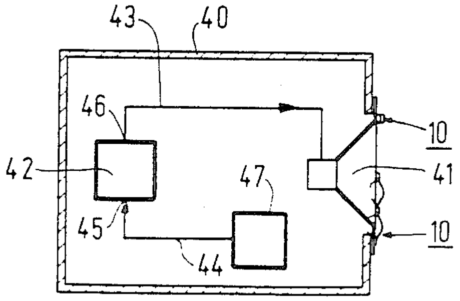
Figure 6:
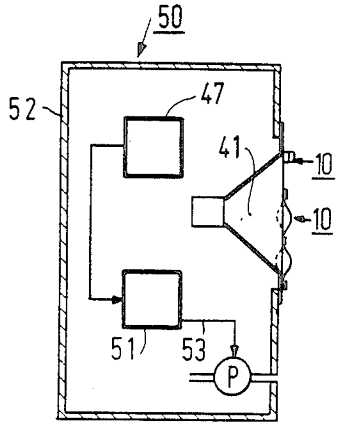
Figure 2A:
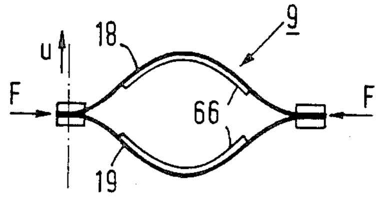
Figure 2B:
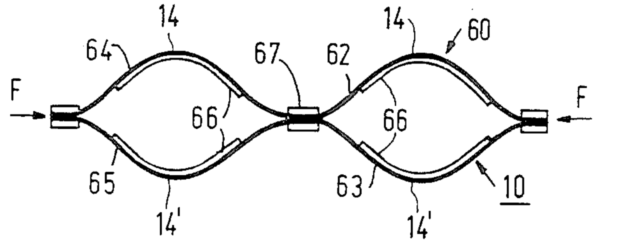
Figure 9:
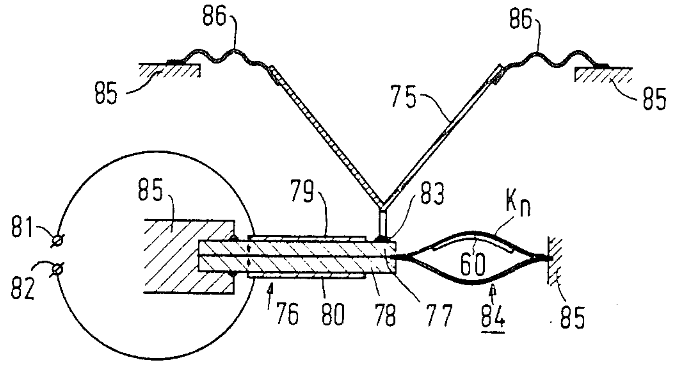
Figure 2C:
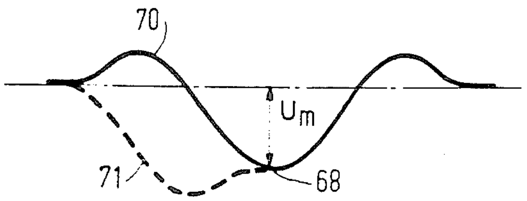
Figure 7A:
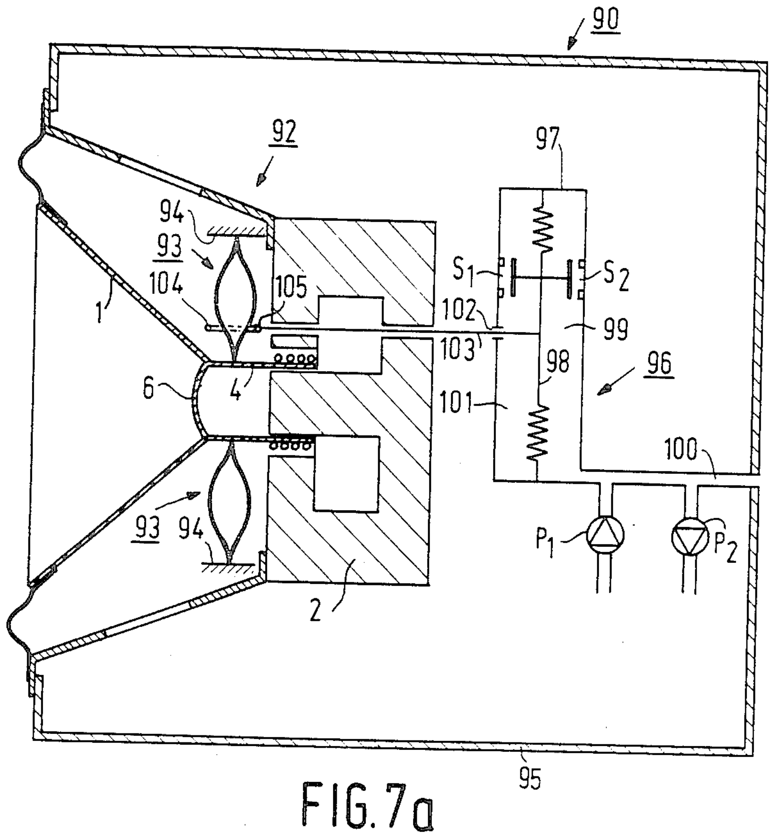
Figure 7C:
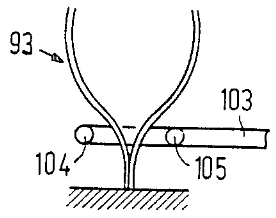
Figure 7B:
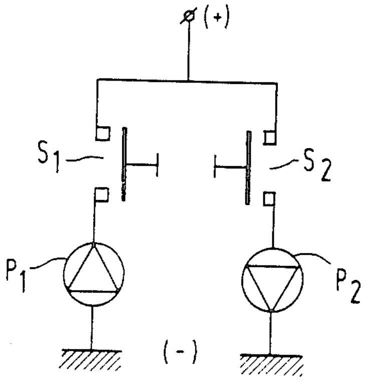
Figure 7D:
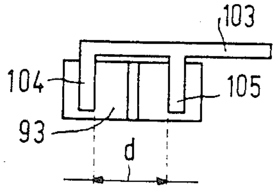
Figure 8:
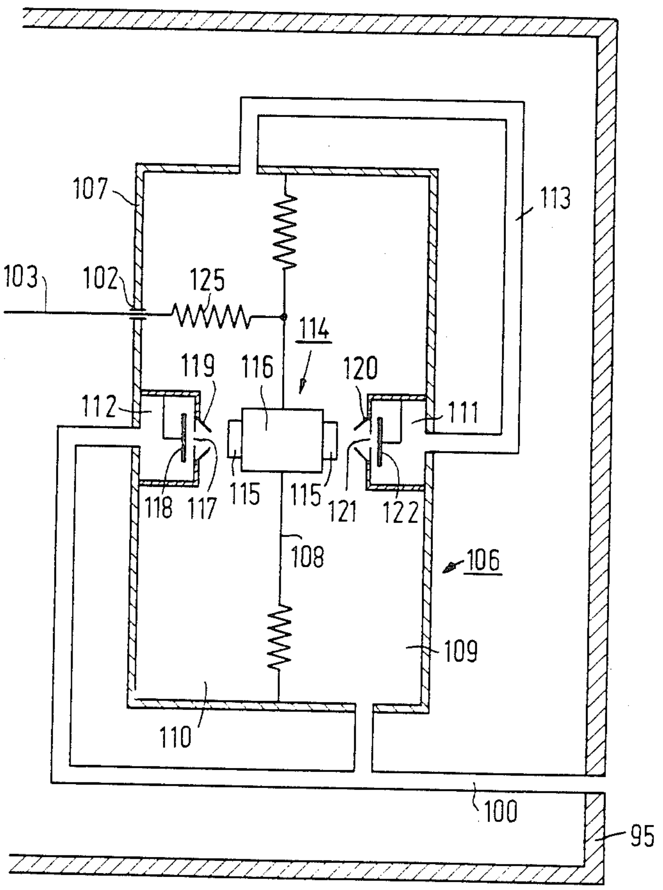

The invention will now be described in more detail, by way of example, with reference to the drawings, in which similar parts bear the same referance numerals in the various Figures. In the drawings:

FIG. 1 shows a first application of the invention, being an electroacoustic transducer unit in the form of a cone loudspeaker, FIG. 1*a* being a plan view, FIG. 1*b* being an axial sectional view of the cone loudspeaker, and FIG. 1*c* being a radial sectional view of the cone loudspeaker, FIG. 2*a* shows an example of a mechanical spring with negative spring stiffness, FIG. 2*b* shows another example of such a spring, and FIG. 2*c* shows a negative spring comprising one blade spring shown in two deflected positions, FIG. 3*a* shows a mechanical spring with positive spring stiffness and FIG. 3*b* shows the spring characteristic of such a spring, FIG. 4*a* shows a mechanical spring with negative spring stiffness and in FIG. 4*b* the spring characteristic of such a spring, FIG. 5 shows a second and FIG. 6 a third application of the invention, FIGS. 7*a* to 7*d* show an electroacoustic transducer unit with a pneumatic position control means for the diaphragm, FIG. 8 shows another example of such a pneumatic control means, and FIG. 9 shows an application of the invention consisting of an electroacoustic transducer unit including piezoelectric transducer.

FIG. 1*a* is a plan view of an electroacoustic transducer unit comprising an electrodynamic transducer in the form of a cone loudspeaker, FIG. 1*b* is a sectional view of the cone loudspeaker taken on the line B—B in FIG. 1*a*, and FIG. 1*c* is a sectional view taken on the line C—C in FIG. 1*b*. The transducer comprises a diaphragm 1 in the form of a cone, a magnet system 2 with an air gap 3, and a voice coil former 4 on which a voice coil 5 is arranged in the air gap 3 of the magnet system 2. The inner rim of the cone 1 is secured to the voice-coil former 4, where it is closed by means of a dust cap 6. The transducer comprises centring means for centring the voice-coil former and/or the diaphragm. FIG. 1*b* shows a centring ring 7 belonging to the centring means, which ring is secured between the outer rim of the cone 1 and a stationary part 8 of the transducer unit, which part may be the loudspeaker chassis. The ring serves as a suspension for the diaphragm 1 and centers the diaphragm at its outer rim. The centring ring 7 is a flexible elastic ring formed with one or more corrugations. Sometimes the centring means also comprise a centring ring (or spider) which centres the voice-coil former 4 in the air gap 3. The apparatus shown in FIG. 1 does not comprise such a centring ring because in general one is not always necessary and because the voice-coil former 4 is now centred in the air gap 3 in a different manner (namely by the mechanical spring 9 to be described hereinafter). The transducer unit shown in FIG. 1 comprises means for reducing the resonant frequency of the transducer. In FIG. 1 these means are designated 9 and 10. The elements designated 9 and 10 are mechanical springs with a negative spring stiffness, which are coupled between a stationary part, 11 and 8 respectively, of the transducer unit and a movable part of the transducer, namely the voice-coil former 4 and the diaphragm 1 respectively.

For correct operation of the means for reducing the resonant frequency of the transducer, said means comprise n mechanical springs with negative spring stiffness, which springs are arranged at angles of 360°/n relative to each other around a central axis 12 of the transducer, where $n \geqq 2$ and is preferably 3 or higher. An advantage of three or more mechanical springs with negative stiffness is that these springs may also function as centring means. However, a centring function can also be achieved if $n=2$ if the (blade) springs have a sufficiently large width/length ratio.

The centring ring (spider) which is generally provided for centring the voice-coil former 4 is now dispensed with. The means 9 for reducing the resonant frequency of the transducer comprise four mechanical springs (see FIG. 1*c*) which are arranged at angles of 90° relative to each other around the central axis 12, so that they can perform the centring function. Each of the four mechanical springs 9 comprises two blade springs 18, 19 (see FIG. 2*a*) whose ends are coupled to each other and which, under the influence of a compressive force F which acts on both ends of the mechanical spring in the direction of an imaginary line through these ends, are each bent towards one of two opposite directions. The springs are secured between the stationary part 11 of the transducer unit and the voice-coil former 4 (see FIG. 1*b*). If the means 9 are not capable of satisfactorily centring the voice-coil former 4, for example if the means 9 comprise only two mechanical springs or their width b is too small, so that it is possible that the voice-coil former 4 will be tilted and the voice coil (former) will be consequently off-centred in the air gap 3, the known centring ring (spider) may be added.

Preferably, at least one of the two facing major surfaces (in FIG. 2*a* both surfaces) of the two blade springs 18 and 19 is (are) provided with spacing means 66 for keeping parts of the two blade springs spaced from each other in the case of large deflections of the diaphragm. This is done in order to avoid that in the case of excessive deflections of one end of the negative spring 9 in FIG. 2*a* in a vertical direction (for example in the upward direction as indicated by the arrow u) one blade spring (in the present case the blade spring 19) collapses and assumes an upwardly bent shape like that of the blade spring 18. Should this happen the point of fixation to the moving part will be subjected to a torque, so that the moving part will be tilted. This results in distortion of the output signal of the transducer. The means 10 for reducing the resonant frequency of the transducer comprise three negative springs (see FIG. 1*a*) which are arranged at angles $\alpha$ of 120° relative to the central axis 12. Each of the three mechanical springs comprises two blade springs 14, 14' (see FIG. 2*b*), the ends of both blade springs and the centres of both blade springs being coupled to each other. Under the influence of the compressive force F the facing halves of both blade springs are each bent in one of two opposite direction. Both ends 15 of each of the negative springs 10 are secured to the stationary part 8 (the loudspeaker chassis) of the transducer and the centre 16 is secured to a (reinforced) rim of the diaphragm 1. This reinforcement is obtained by means of a reinforcement ring 17 (see FIG. 1*b*). Although the means 10 also have a centring function the centering ring 7 may not be dispensed with because the suspension 7 also has an acoustic sealing function.

Preferably, at least one of the two facing major surfaces (both surfaces in FIG. 2*b*) of the blade springs 14 and 14' is (are) provided with spacing means 66 for keeping parts of the two blade springs spaced from each other in the case of a (too) large excursion of the diaphragm.

In the version of a negative spring, see FIG. 2*c*, known from the afore-mentioned dissertation by J. F. Dijksman the centre 68 is in unstable equilibrium for rotational mvoement about an axis perpendicular to the plane of the drawing and is unstable with respect to lateral displacements. Moreover, the blade spring in FIG. 2*c* may readily collapse to the other side in the case of a large excursion $u_m$, so that the centre 68 may be tilted. In FIG. 2*c* the normally deflected position of the blade spring is designated 70 and the position of the blade spring if only the left half has collapsed to the other side is designated 71. Such a collapse results in both mechanically and acoustically undesirable effects. The version shown in FIG. 2*b* does not give rise to these undesirable effects. This version presents resistance to lateral displacements of the centre 67 in a direction perpendicular to the direction in which the negative spring deflects, i.e. in the horizontal direction in FIG. 2*b*, and resistance to rotation (pivoting) of the centre 67 about an axis perpendicular to the plane of the drawing. This means that the centre 67 is in stable equilibrium with respect to rotational (pivotal) movements and lateral displacements. It is to be noted that the lateral displacement and the pivotal movements of the centre 68 of the negative spring shown in FIG. 2*c* are coupled movements and are therefore interdependent. For the spring shown in FIG. 2*b* a lateral displacement does not give rise to a pivotal movement and vice versa. Moreover, the spacing means 66 preclude collapsing of the blade springs to the other side. During the return movement from an extreme position to the centre position, the blade springs therefore automatically resume the shape shown in FIG. 2*b*.

Instead of equipping the means 10 with one negative spring 14 it is possible to use two negative springs in the same way as the means 9, which springs are arranged in line with each other. The ends of the negative springs which are near each other are secured to each other and to the diaphragm. The two ends which are remote from each other must then be secured to the stationary part 8. An advantage of the means 10 is that the compressive force which is required for bending the springs and which is directed perpendicular to the direction of movement of the diaphragm does not act on the diaphragm.

It is obvious that in principle the means 9 and 10 may be interchanged. Of course it is also possible to provide only the means 9 or only the means 10 for reducing the resonant frequency of the transducer. The two ends 15 of each portion of the means 10 may also be secured to a stationary part of the enclosure (loudspeaker box) in which the transducer is accommodated instead of to the chassis of the transducer itself. Finally, it is of course possible to secure the ends 15 of each portion of the means 10 to the diaphragm and the centre 16 to a stationary part. Then, additional connecting means must be arranged between the centre 16 and the stationary part in the embodiment shown in FIG. 1.

In order to damp mechanical vibrations which may arise in the blade springs and which, if they do, produce an undesired acoustic contribution to the output signal of the transducer (distortion), it is advisable to provide the blade springs with a layer of a damping material. FIG. 2*b* shows a version in which a layer of damping material, for example a layer of rubber, is arranged on a major surface of each of the two blade springs, which layer also constitutes the aforesaid spacing means bearing the reference numeral 66.

The mechanical springs with negative spring stiffness described are all blade springs which are clamped at their ends. However, it is alternatively possible to use a different, for example pivotal, mounting for one or both ends.

The influence of the means for reducing the resonant frequency of the transducer may be explained as follows. The resonant frequency of this transducer is given by $$f_r = 1/2\pi\sqrt{k/m}$$

where m = the sum of the mass (in [kg]) of the diaphragm 1, the voice-coil former 4, the voice coil 5, the air load and the moving portions of the mechanical springs with negative spring stiffness, and k = the spring constant (spring stiffness) (in [N/m]) experienced by the mass m when it vibrates.

In the known transducers which are not provided with means for reducing the resonant frequency of the transducer, the spring constant k comprises a contribution from the centring means or suspension ($k_1$) and, if the transducer is accommodated in an enclosure (loudspeaker box), a contribution from the air volume behind the diaphragm ($k_b$). Therefore $k = k_1 + k_b$. If the transducer is accommodated in a closed loudspeaker box, the resonant frequency of the transducer increases. This can be explained by means of an example. The resonant frequency of an isolated 8-inch bass loudspeaker (woofer) having a moving mass m of 0.015 kg and a spring constant $k_1$ of 1000 N/m is approximately 40 Hz whereas if this loudspeaker is accommodated in an enclosure with a volume of 25 l (for which $k_b \sim 2000$ N/m) its resonant frequency increases to approximately 70 Hz. Moreover, in the case of enclosures having a volume smaller than 25 l the resonant frequency will be even higher (than 70 Hz). When the mechanical spring with negative spring stiffness is added the spring constant k is given by the following formula $$k = k_1 + k_b + k_n \qquad (2)$$

where $k_n$ is the (negative) spring stiffness of the mechanical spring. In the present example it is therefore necessary to make $k_n = -2000$ in order to reduce the resonant frequency of the transducer to 40 Hz when it is in the loudspeaker box.

It is obvious that for correct physical operation of the transducer the values of the values sring stiffnesses must be selected so that k in formula (2) is greater than or equal to zero.

The behaviour, operation and properties of a mechanical spring with positive spring stiffness and a mechanical spring with negative spring stiffness are illustrated in FIGS. 3 and 4 respectively. FIG. 3*a* shows a mechanical spring 20 having a positive spring stiffness in the unloaded condition (the left-hand spring in FIG. 3*a*) and in a loaded or extended condition (the right-hand spring in FIG. 3*a*). FIG. 3*b* shows the spring characteristic 21 of the spring 20. In this Figure the force F (in [N]) exerted on the spring 20 is plotted as a function of its deflection x in [m]). This relationship is given (idealised) by the formula $$F=k.x \quad (3)$$

where k is again the spring constant or spring stiffness of the spring. Furthermore $k=\tan\beta$, $\beta$ being the angle between the curve 21 in FIG. 3*b* and the horizontal axis. In order to keep the elongated spring in its extended position with a deflection $\Delta x$ a force F' must be exerted on the end 22 of the spring in a direction which corresponds to the direction of the deflection $\Delta x$. If the force F' is removed the spring will return to its unloaded condition ($x=0$). The system in FIG. 3*a* is in a stable equilibrium in the position $x=0$. After removal of the load the spring always returns from an elongated condition to the unloaded or zero condition ($x=0$). This is in contradistinction to the mechanical spring 9 with negative spring stiffness as shown in FIG. 4*a*. FIG. 4*a* shows the mechanical spring 9 of FIG. 1 in a non-deflected condition ($x=0$) of the voice-coil former and in a deflected condition ($x=\Delta x$). A part of the voice-coil former 4 is also shown. The non-deflected condition of the spring 9 is indicated by solid lines. FIG. 4*b* shows the spring characteristic 26 of the spring 9. It is obvious that $k=\tan\gamma$ yields a negative value. In order to keep the spring 9 in the deflected condition $x=\Delta x$ a force F' must be exerted on the end 27 of the spring 9, which force acts in a direction opposite to the direction of the deflection $\Delta x$. This means that if the force is removed the spring will move in a direction in which $\Delta x$ increases and will subsequently move to a specific maximum-deflection condition $x=x_m$ (see FIG. 4*b*). The system in FIG. 4*a* is therefore in an unstable equilibrium in the position $x=0$. Even a slight departure from this position results in the spring assuming one of its positions of maximum deflection $x_m$ or $-x_m$.

As is indicated under formula (2) the various spring stiffnesses are selected so that k in formula (2) is greater than or equal to zero. A transducer unit provided with a mechanical spring with negative spring stiffness and in which the transducer is accommodated in an ideally sealed enclosure therefore has a diaphragm which is in a state of stable equilibrium in its rest condition (i.e. the diaphragm has a deflection equal to zero). A small deflection of the diaphragm out of its rest or zero position after release of the diaphragm will result in a return movement of the diaphragm to its zero position.

In the absence of the enclosure, k in formula (2) becomes equal to $k_1+k_n$. When the transducer is accommodated in a sealed enclosure (which in general is not entirely airtight) k also becomes equal to $k_1+k_n$ especially for low frequencies. Thus, depending on the values for $k_1$ and $k_n$ the spring constant k may be positive or negative under such conditions. If in the present case k is still positive the diaphragm is again in a state of equilibrium in its zero position. However, if in this case k is negative, the diaphragm is in a state of unstable equilibrium in its zero position. As already stated hereinbefore with reference to FIG. 4, this means that after a small excursion of the diaphragm the diaphragm will move further in the direction of the initial excursion until finally it occupies its position of maximum deflection. This applies to transducers for which $-k_n>k_1$.

Without special control means the average position of the diaphragm will therfore depart slowly from its zero position during use of the transducer unit. Moreover, even when the transducer unit is not in use the diaphragm will be in its position of maximum deflection.

Therefore, if $-k_n>k_1$ then, before the transducer unit is put into use the diaphragm must be reset to its zero position by means of a control device. Moreover, the control device must also correct the position of the diaphragm during use of the transducer unit.

If the transducer is arranged in an at least substantially airtight enclosure a control method may be used which operates only for low frequencies. For high frequencies the transducer unit comprising the transducer in the enclosure is stable because the diaphragm then also "sees" the spring stiffness of the enclosure volume. For low frequencies the spring stiffness of the enclosure volume is ignored because of inevitable leaks in the enclosure, so that the transducer unit is unstable for low frequencies.

FIG. 5 shows an example of a transducer unit provided with a transducer 41, for example the transducer as described with reference to FIG. 1 (i.e. provided with mechanical springs with negative spring stiffness), accommodated in an at least substantially airtight enclosure 40. The transducer unit is further provided with said control device (bearing the reference numeral 42 in FIG. 5) for correcting the position of the diaphragm of the transducer under the influence of a control signal 43 generated by the control device 42. For this purpose the transducer unit comprises detection means 47 for detecting the average position of the diaphragm relative to its zero position. The detection means may be capacitive. This means that the capacitance between two plates is determined, one of the plates being secured to the diaphragm of the transducer and the other being a stationary plate. Another possibility is to use inductive detection means. This means that, for example, a metal plate on the diaphragm cooperates with a stationary coil and the average position (in time) of the diaphragm is determined by measuring the inductance of the coil. Without exhaustively describing the detection means it is to be noted that opto-electronic detection means may be used. This may be achieved, for example, by means of a light beam from a stationary light sourvce which is incident on the diaphragm surface. The light reflected by the diaphragm surface can be detected by means of a light-sensitive cell. The output signal of the detection means is applied to an input 45 of the control device 42 via the connection 44. In response to the signal applied to its input 45, the control device generates the control signal 43 on its output 46 by means of which signal the (time) average position of the diaphragm can be made to coincide with the zeo position of the diaphragm. FIG. 5 shows a transducer unit in which the control device 42 is adapted to supply the control signal 43 to the voice coil of the transducer 41 in order to correct the (time) average position of the diaphragm. The electrical construction of the control device 42 will not be described in more detail because the construction of such a control device does not need any special knowledge on the part of a man skilled in the art.

FIG. 6 shows another transducer unit 50 equipped with a control device 51. The detection means 47 again supply an output signal to the control device 51 via the connection 44. The electroacoustic transducer unit 50 comprises the electrodynamic transducer 41 accommodated in an at least substantially airtight enclosure (loudspeaker box) 52. Again the diaphragm 1 should be at least substantially airtight (i.e. it should not be porous). The transducer unit 50 further comprises an air pump P and the control device 51 is adapted to supply a control signal 53 to the air pump P for correcting the position of the diaphragm by varying the air pressure in the loudspeaker enclosure. If, for example, before the transducer unit 50 is put into use, the diaphragm is in a position of maximum outward deflection the control device 51 supplies a control signal 53 to the air pump P such that this pump removes a small amount of air from the interior of the enclosure 52 thereby reducing the pressure in the enclosure 52. This reduced pressure in the enclosure exists only temporarily because it causes the diaphragm to move towards its zero position until the pressure in the enclosure again corresponds to the atmospheric pressure. Conversely, if the diaphragm is directed inwardly in its position of maximum excursion the air pump should raise the pressure in the enclosure. It will be evident that after use of the transducer unit the diaphragm will assume one of its positions of maximum excursion because the enclosure 52 is never completely airtight. Via the air leaks the air pressure in the enclosure will adapt itself to (the volume of the enclosure corresponding to) the instantaneous position of the diaphragm. However, also during use of the transducer unit the average position of the diaphragm will vary and must be corrected by the control device. If during use of the transducer unit the average position of the diaphragm departs from the zero position, for example in an outward direction, the air pressure in the enclosure will decrease. The air pump P must then remove air from the enclosure for a short time so that instantaneously the pressure in the enclosure is reduced further. As a result of this the diaphragm moves back to its zero position and the air pressure in the enclosure increases until it corresponds to the atmospheric pressure. It is obvious that a similar reasoning applies when the average position of the diaphragm changes from the zero position in an inward direction during use of the transducer unit.

The electrical construction of the control device 51 will not be described in more detail because the construction of such a control device for position control again needs no special knowledge on the part of those skilled in the art.

FIGS. *7a* to *7d* show an elaborated version of the transducer unit shown in FIG. 6. The transducer unit 90 comprises an electrodynamic transducer 92 provided with mechanical springs 93 with negative spring stiffness, which springs are coupled between the voice-coil former 4 and a stationary point of the transducer unit (schematically indicated in FIG. *7a*, see the parts bearing the reference numeral 94). The mechanical springs 93 each correspond to the mechanical spring as shown in FIG. *2a*. The transducer 92 is accommodated in an at least substantially airtight enclosure (loudspeaker box) 95. In the apparatus shown in FIG. *7a* the average position of the diaphragm 1 is corrected pneumatically. For this purpose the transducer unit 90 comprises a combined device 96 for the detection means and the control device. The present detection means detect the average air pressure in the box 95. The control device 96 comprises a box 97 which is divided into two compartments by means of an elastic air-impermeable diaphragm 98. One compartment 99 communicates with the atmospheric air (pressure) via the tube 100. The other compartment 101 communicates with the volume inside the enclosure 95 via a capillary 102. The diaphragm 98 cooperates with two switches $S_1$ and $S_2$. Electrically these switches $S_1$ and $S_2$ are arranged in series with two air pumps $P_1$ and $P_2$ respectively (see FIG. *7b*). By closing switch $S_1$ the air pump $P_1$ is connected to the power supply (+) so that the air pump $P_1$ is put into operation and air is pumped out of the enclosure 95 via the tube 100. Conversely, by closing switch $S_2$ the air pump $P_2$ is connected to the power supply (+) and atmospheric air is pumped into the enclosure via the tube 100. The operation is as follows. When the average position of the diaphragm corresponds to its zero position the two switches $S_1$ and $S_2$ are open. When the average position of the diaphragm 1 of the transducer deviates from the zero position of the diaphragm during use of the transducer, the average air pressure in the enclosure (which in the normal case is equal to the atmospheric pressure) will change. If this deviation is directed to the left in FIG. *7a* the pressure in the housing 95 will be reduced. Since the capillary 102 acts as a low-pass filter for the high-frequency air-pressure variations inside the enclosure, which high-frequency air-pressure variations are caused by the vibrating diaphragm 1 of the transducer 92, the air pressure in the compartment 101 will correspond to the average air pressure in the enclosure. However, since there is a reduced pressure the diaphragm 98 will move to the left in FIG. 7. Switch $S_1$ is closed so that the air pump $P_1$ is actuated. This results in a brief further reduction of the air pressure inside the enclosure 95. As a result of the larger air-pressure difference between the outside and the inside of the enclosure the position of the diaphragm 1, averaged in time, will again move to the right in FIG. *7a*. The air pressure in the enclosure then increases to the atmospheric pressure. Conversely, if during use of the transducer the average position of the diaphragm of the transducer shifts to the right in FIG. *7a*, the pressure in the enclosure 95 and in the compartment 101 increases, so that the diaphragm 98 is moved to the right and the switch $S_2$ is closed. As a result of this, the air pump $P_2$ is actuated so that the air pressure in the enclosure 95 increases further and subsequently the average position of the diaphragm 1 is again shifted to the left. The air pressure in the enclosure then decreases again to the atmospheric pressure.

The control system described so far is not capable of returning the diaphragm, which is in one of its extreme positions when the transducer unit is inoperative, from these extreme positions to the zero position. This is because the air pressures inside and outside of the enclosure are the same, namely equal to the normal atmospheric air pressure. In order to solve this problem the diaphragm 98 is connected to a rod 103 provided with two stops 104 and 105. The stops 104 and 105 are adapted to cooperate with the mechanical spring 93. FIGS. *7c* and *7d* show different views of the construction. The distance d between the stops is selected so that during normal use of the transducer 92 the mechanical spring 93 does not contact the stops. If the transducer is inoperative the diaphragm 1 is in one of its extreme positions (for example to the right in FIG. 7*a*). The mechanical spring 93 now makes contact with the stop 105 and urges this stop and consequently the diaphragm 98 to the right, so that the switch $S_2$ is closed. If the transducer unit is now switched on the air pump $P_2$ directly pumps air into the enclosure 95. Owing to the increased pressure the diaphragm 1 will move to the left, and will continue to do so after the mechanical spring 93 has become disengaged from the stop 105, and will move towards the zero position.

FIG. 8 is a sectional view of another version of the device 96 in a transducer unit as shown in FIG. 7*a*. This device, which bears the reference 106 in FIG. 8, again comprises a box 107 which is divided into two compartments 109 and 110 by means of an elastic air-impermeable diaphragm 108. One compartment 109 again communicates with the atmospheric air pressure via the tube 100. The other compartment 110 communicates with the volume of air inside the enclosure 95 via the capillary 102. The box 107 also contains compartments 111 and 112. The compartment 111 also communicates with the volume inside the enclosure 95 via a tube 113, the compartment 110 and the capillary 102. The compartment 112 communicates with the atmospheric air via the tube 100. A resonator 114 is mounted on (in) the diaphragm 108. Its vibrating portion 115 continually moves with a frequency of for example 50 Hz relative to its housing 116, in FIG. 8 in a direction corresponding to a horizontal line through the centre of the resonator 114. The two compartments 110 and 112 communicate with each other via an aperture 117 in the partition between them. On the side of the compartment 112 the aperture 117 is closed by a spring-loaded valve 118. For the sake of clarity FIG. 8 shows the valve 118 in a position in which it is lifted off the aperture. A rubber cup spring 119 is arranged around the aperture 117 on the side of the compartment 110. In a similar way a rubber cup spring 120 is fitted around an aperture 121 in the partition between the compartments 109 and 111. On the side of the compartment 111 the aperture 121 is closed by a spring-loaded valve 122. For the sake of clarity the valve 122 is again shown in the position in which it is lifted off the aperture.

If during use of the transducer the average position of the diaphragm 1 of the transducer corresponds to the zero position, the air pressures in the compartments 110 and 109 are equal to each other. The diaphragm 108 is then in its centre position, which means that the resonator 116 does not contact the cup srpings 119 and 120.

If the average position of the diaphragm 1 is shifted slightly to the left under the influence of the mechanical springs (see FIG. 7) the pressure in the volume of the enclosure and in the compartment 110 will be reduced. The diaphragm 108 with the resonator 116 will then move to the left. The vibrating portion 115 of the resonator 116 will now contact the cup spring 119 with a frequency of 50 Hz, so that the amount of air enclosed between the valve 118, the partition, the cup spring 119 and the vibrating portion 115 is forced into the compartment 112 in one stroke of the vibrating portion 115 from the right to the left. For the next half vibration period of the resonator 116 the vibrating portion 115 is clear of the spring. The valve 118 prevents the reflux of air from the compartment 112 to the compartment 110. In the next stroke of the vibrating portion 115, an amount of air again is forced into the compartment 112. The vibrating portion 115 thus cooperates with the valve 118 and the cup spring 119 in the same way as a pump so that an amount of air is pumped out of the enclosure. The average position of the diaphragm 1 in the transducer is thus controlled towards the zero position. If the diaphragm 1 is shifted from the zero position to the right the increased pressure in the enclosure 95 will cause the diaphragm 108 to move to the right. The vibrating portion 115 now cooperates with the cup spring 120 and the valve 122 and now functions as a pump, so that air is pumped from the compartment 109 to the compartment 111 and thus into the volume of the enclosure (via the tube 113, the compartment 110 and the capillary 102). As a result of this the diaphragm 1 is moved to the left (see FIG. 7) towards its zero position.

In this version of the means the rod 103 with its stops 104 and 105 is again necessary in order to enable the control system to control the diaphragm 1 from its extreme position to the zero position when the transducer unit is switched on. The additional spring 125 is necessary to actuate the vibrator 116 when the transducer unit is switched on. The spring 125 reduces the force with which the vibrating portion 115 acts on the cup spring before the transducer unit is switched on, namely to such a low value that it is smaller than the vibration force of the resonator 116.

FIG. 9 shows an electroacoustic transducer in the form of a piezoelectric transducer. The transducer comprises a diaphragm 75 which is driven by a piezoelectric actuator 76. Such actuators may be of various constructions. FIG. 9 shows a two-layer actuator (bimorph). The two layers 77 and 78 are polarized oppositely and are each provided with a metallic layer (electrode) 79 and 80 to which the audio signal is applied via the terminals 81 and 82. As a result of the opposite directions of polarization one piezoelectric layer will expand and the other layer will contract under the influence of a direct voltage applied to the terminals 81, 82. This causes the end 83 of the actuator and consequently the diaphragm 75 to move upwards or downwards.

Furthermore, the transducer comprises a mechanical spring 84 with negative spring stiffness $k_n$. The mechanical spring 84 is constructed as shown in FIG. 2*a* but only one of the two blade springs is provided with spacing means. It is obvious that as an alternative the spring 10 shown in FIG. 2*b* may be used in which case the centre 67 may be secured to the actuator at the location 83. The parts designated 85 are stationary parts of the transducer (unit). The outer rim of the diaphragm 75 is connected to the stationary part 85 via a centring diaphragm or suspension 86.

The resonant frequency of the transducer shown in FIG. 9 is also given by formula (1) as discussed with reference to FIG. 1. The mass m now is the mass of the diaphragm 75 and (a part) of the mass of the actuator 76 and the spring 84. The spring constant (spring stiffness) k is given by $$k=k_1+k_1+k_b+k_n$$

where $k_a$ is the contribution of the actuator to the spring constant.

It is to be noted that the invention is not limited to the embodiments described with reference to the Figures. For example, the invention may be employed in an electro-acoustic transducer unit which does not include an enclosure. Moreover, it may be employed in electroacoustic transducer units which differ from the electroacoustic transducer units shown in FIGS. 1 and 9 with respect to points which do not relate to the inventive ideas as defined in the claims. This means for example that the invention may also be applied to an electrodynamic transducer unit provided with a dome-shaped diaphragm and to other, for example piezoelectric, transducer units. In all cases the mechanical spring with negative spring stiffness will be coupled between a stationary part of the transducer unit (which may be either a stationary part of the transducer - chassis - or a stationary part of the enclosure - loudspeaker box -) and a movable part of the transducer (e.g. diaphragm, voicecoil former or actuator).

Moreover, the invention may be employed in electroacoustic transducer units, comprising an electroacoustic transducer accommodated in an enclosure, which differ from the embodiments described with reference to FIGS. 5, 6, 7 and 8 with respect to points which do not relate to the inventive idea as defined in the claims.

It is to be noted also that although the resilient element comprising two blade springs as shown in FIG. 2*b*, with or without spacing means, has been described for use in electroacoustic transducers, this resilient element may also be used in other devices, namely in those cases where a correction is required for resilient elements with undesired positive spring stiffnesses.

Finally, it is to be noted that although the ends of the blade springs are coupled to each other and to other parts of the construction by clamping, other positioning methods are also possible, for example a knife-edge bearing as shown in U.S. Pat. No. 3,109,901, see for example FIG. 6. Moreover, the resilient element shown in FIG. 2*b* may be different. The two blade springs then comprise the halves 62, 65 and 63, 64 repsectively. At the location of the centre 67 the two blade springs are coupled to each other, crossing each other at a specific angle.

What is claimed is:

1. A mechanical spring with negative spring stiffness comprising: first and second blade springs, the first blade spring, under the influence of a compressive force which acts in a direction perpendicular to the direction of deflection of the blade spring, being bent in a direction corresponding to said direction of deflection such that two halves of the blade spring are each bent one time, characterized in that the ends and the centers of the first and second blade springs are coupled to each other, the second blade spring is bent under the influence of said compressive force in such a way that the two halves of the second blade spring are each bent one time in a direction corresponding to said direction of deflection, and facing halves of the two blade springs are each bent in opposite directions.

2. A mechanical spring as claimed in claim 1, wherein at least one of the two facing major surfaces of the blade springs includes spacing means for keeping parts of the two blade springs spaced from each other in the case of a large deflection of the mechanical spring in said direction of deflection.

3. A mechanical spring having negative spring stiffness comprising: first and second blade springs each having first and second ends and a center, the first ends of the first and second blade springs being mechanically coupled to each other, the second ends of the first and second blade springs being mechanically coupled to each other, and the centers of the first and second blade springs being mechanically coupled to each other, said first and second blade springs being subject to a compressive force acting in a direction perpendicular to the direction of deflection of the blade springs so that facing havles of the first and second blade springs are each bent into a bow shape in opposite directions, each blade spring being bent under the influence of said compressive force such that the two halves of each blade spring are each bent one time in a direction corresponding to said direction of deflection.

4. A mechanical spring as claimed in claim 3 wherein the first and second ends of the first and second blade springs are adapted to be mechanically coupled to a stationary member and said centers of the blade springs are adapted to be mechanically coupled to a member movable in a direction parallel to said direction of deflection.

5. A mechanical spring as claimed in claim 3 wherein at least one of two facing major surfaces of the blade springs includes a spacer element to prevent contact between the blade springs in the event of a large deflection of the mechanical spring along said direction of deflection.

6. A mechanical spring as claimed in claim 5 wherein the spacer element comprises a layer of acoustic damping material.

7. A mechanical spring as claimed in claim 3 wherein said compressive force acts on the first and second ends of the blade springs along an imaginary line passing through the said first and second ends of the blade springs.

8. A mechanical spring as claimed in claim 3 wherein the direction of deflection of said first and second blade springs is perpendicualr to a longitudinal axis of each said blade spring.

* * * * *

UNITED STATES PATENT AND TRADEMARK OFFICE

CERTIFICATE OF CORRECTION

PATENT NO. : 4,722,517

DATED : February 2, 1988

INVENTOR(S) : Kees Dijkstra Et Al

It is certified that error appears in the above-identified patent and that said Letters Patent is hereby corrected as shown below:

On the Title Page,
Item [73] Assignee: U.S. Philips Corporation, New York, N.Y.

Signed and Sealed this

Eleventh Day of July, 1989

*Attest:*

DONALD J. QUIGG

*Attesting Officer* *Commissioner of Patents and Trademarks*